(12) United States Patent　　(10) Patent No.: US 11,140,069 B2
Jayaraman et al.　　(45) Date of Patent: Oct. 5, 2021

(54) OPTIMIZING INFORMATION RELATED TO A ROUTE AND/OR A NEXT HOP FOR MULTICAST TRAFFIC

(71) Applicant: Juniper Networks, Inc., Sunnyvale, CA (US)

(72) Inventors: Vijayananda Jayaraman, Milpitas, CA (US); Ravi Shekhar, Sunnyvale, CA (US); Sri Ram N. Bathina, San Jose, CA (US); Shashvat A. Thakor, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/245,385

(22) Filed: Jan. 11, 2019

(65) Prior Publication Data

US 2019/0149452 A1　　May 16, 2019

Related U.S. Application Data

(63) Continuation of application No. 15/381,905, filed on Dec. 16, 2016, now Pat. No. 10,181,999.

(51) Int. Cl.
*H04L 12/761*　　(2013.01)
*H04L 12/18*　　(2006.01)
(Continued)

(52) U.S. Cl.
CPC .............. *H04L 45/16* (2013.01); *H04L 12/18* (2013.01); *H04L 12/185* (2013.01);
(Continued)

(58) Field of Classification Search
None
See application file for complete search history.

(56) References Cited

U.S. PATENT DOCUMENTS 6,707,796 B1　3/2004　Li
7,649,884 B1 *　1/2010　Ahmed ................. H04L 45/026
　　　　　　　　　　　　　　370/390

(Continued)

FOREIGN PATENT DOCUMENTS

CN　　1881931 A　　12/2006
CN　　102724120 A　　10/2012
CN　　105978804 A　　9/2016

OTHER PUBLICATIONS

Juniper Networks, "QFabric System," http://www.juniper.net/us/en/products-services/switching/qfabric-system/, May 3, 2013, 6 pages.
(Continued)

*Primary Examiner* — Shripal K Khajuria
(74) *Attorney, Agent, or Firm* — Harrity & Harrity, LLP

(57) ABSTRACT

A first device may receive information that identifies a second device. The second device may be connected to the first device or a third device. The second device may be a source of traffic to be received by the first device. The first device may determine whether the second device is local or remote to the first device based on receiving the information. The first device may store first information or second information based on determining whether the second device is local or remote. The first information may identify a route associated with the second device. The second information may identify a single route associated with multiple second devices. The first device may provide the traffic using the first information or the second information after storing the first information or the second information.

20 Claims, 7 Drawing Sheets

(51) Int. Cl.
 *H04L 12/46* (2006.01)
 *H04L 12/733* (2013.01)
 *H04L 12/701* (2013.01)
 *H04L 12/863* (2013.01)

(52) U.S. Cl.
 CPC .......... *H04L 12/4641* (2013.01); *H04L 45/00* (2013.01); *H04L 45/20* (2013.01); *H04L 47/54* (2013.01)

(56) References Cited

U.S. PATENT DOCUMENTS

| | | | |
|---|---|---|---|
| 7,990,963 B1 | 8/2011 | Aggarwal et al. | |
| 8,615,015 B1* | 12/2013 | Shekhar | H04L 45/54 |
| | | | 370/256 |
| 8,873,563 B2 | 10/2014 | Sen et al. | |
| 9,510,133 B2 | 11/2016 | Gupta et al. | |
| 10,181,999 B2 | 1/2019 | Jayaraman et al. | |
| 2014/0189154 A1* | 7/2014 | Morris | H04L 45/02 |
| | | | 709/238 |
| 2015/0263867 A1 | 9/2015 | Chen | |
| 2016/0183163 A1 | 6/2016 | Yang et al. | |
| 2016/0261503 A1 | 9/2016 | Burgess | |
| 2016/0380889 A1 | 12/2016 | Chen | |
| 2017/0026282 A1* | 1/2017 | Huang | H04W 40/248 |
| 2017/0257439 A1 | 9/2017 | Wang | |

OTHER PUBLICATIONS

Juniper Networks, "QFabric System," https://www.juniper.net/assets/us/en/local/pdf/datasheets/1000393-en.pdf, Jun. 15, 2012, 11 pages.
Juniper Networks, "The Juniper Networks QFabric Architecture: A Revolution in Data Center Network Design," http://www.digitalgovernment.com/media/Downloads/asset_upload_file932_3427.pdf, Feb. 2011, 10 pages.
Juniper Networks, "Designing a Layer 3 Data Center Network With the QFabric Architecture," http://www.juniper.net/us/en/local/pdf/implementation-guides/8010083-en.pdf, Sep. 26, 2012, 32 pages.
Wikipedia, "OpenFlow," https://en.wikipedia.org/wiki/OpenFlow, Nov. 10, 2016, 4 pages.
Wikipedia, "Protocol Independent Multicast," https://en.wikipedia.org/wiki/Protocol_Independent_Multicast, Sep. 4, 2016, 4 pages.
Extended European Search report corresponding to EP 17164031.1 dated Aug. 3, 2017, 8 pages.
Extended European Search Report for Application No. EP20190132.9, dated Oct. 13, 2020, 9 pages.

* cited by examiner

OPTIMIZING INFORMATION RELATED TO A ROUTE AND/OR A NEXT HOP FOR MULTICAST TRAFFIC

RELATED APPLICATION

This application is a continuation of U.S. patent application Ser. No. 15/381,905, filed Dec. 16, 2016 (now U.S. Pat. No. 10,181,999), the disclosure of which is incorporated herein by reference.

BACKGROUND

In network communications, multicasting may include a type of group communication where traffic is addressed to a group of interested receivers simultaneously in a single transmission. Internet protocol (IP) multicasting is an IP-specific version of multicasting. In IP multicasting, IP traffic may be sent to a group of interested receivers in a single transmission. IP multicasting may be employed for streaming media applications on the Internet and private networks.

SUMMARY

According to some possible implementations, a first device may receive information that identifies a second device. The second device may be connected to the first device or a third device via an ingress interface of the first device or the third device. The first device may determine whether the second device is connected to the first device or the third device. The second device may be local to the first device when connected to the first device. The second device may be remote to the first device when connected to the third device. The first device may store first route information or second route information based on determining whether the second device is connected to the first device or the third device. The first route information may identify a route associated with the second device. The second route information may identify an aggregated route for multiple devices. The multiple devices may include the second device. The first device may provide traffic received from the second device using the first route information or the second route information after storing the first route information or the second route information.

According to some possible implementations, a non-transitory computer-readable medium may store one or more instructions that, when executed by one or more processors of a first device, cause the one or more processors to receive information that identifies a plurality of second devices. The plurality of second devices may be connected to the first device or a third device. The plurality of second devices are to be a plurality of sources of traffic to be received by the first device. The one or more instructions may cause the one or more processors of the first device to determine whether the plurality of second devices is local or remote to the first device based on receiving the information. The one or more instructions may cause the one or more processors of the first device to store first information or second information based on determining whether the plurality of second devices is local or remote. The first information may identify a plurality of routes associated with the plurality of second devices. The second information may identify a single route associated with the plurality of second devices. The one or more instructions may cause the one or more processors of the first device to provide the traffic using the first information or the second information after storing the first information or the second information. The traffic may be multicast traffic.

According to some possible implementations, a method may include receiving, by a first device, information that identifies one or more sources of traffic. The traffic is to be received by the first device. The one or more sources may be associated with the first device or a second device. The method may include determining, by the first device, whether the one or more sources are connected to the first device or the second device based on receiving the information. The one or more sources may be local to the first device when connected to the first device. The one or more sources may be remote to the first device when connected to the second device. The method may include storing, by the first device, first information or second information based on determining whether the one or more sources are connected to the first device or the second device. The first information may identify one or more routes associated with the one or more sources. The second information may identify a single route associated with multiple sources including the one or more sources. The method may include providing, by the first device, traffic using the first information or the second information after storing the first information or the second information.

DETAILED DESCRIPTION

The following detailed description of example implementations refers to the accompanying drawings. The same reference numbers in different drawings may identify the same or similar elements.

A network device may store route information identifying routes associated with the network device and/or other network devices. The information may identify a route for traffic (e.g., multicast traffic) flowing between the network devices. In addition, the network device may store information identifying a next hop from among multiple network devices for traffic (e.g., multicast traffic). In some instances, network device memory resources that are used to store the information identifying the route and/or the next hop may limit the amount of information that the network device can store (e.g., by limiting a quantity of route or next hop identifiers that the network device can store).

Implementations described herein permit a network device to aggregate and/or consolidate the information related to a route and/or a next hop. In this way, the network device conserves memory resources by reducing an amount of information that the network device has to store, and conserves processing resources by reducing an amount of information that the network device has to process to perform a lookup of a route and/or a next hop for traffic. In addition, the network device increases an efficiency of performing a route lookup and/or a next hop lookup by reducing an amount of time that the network device takes to perform the look up. In addition, this increases a quantity of routes and/or next hops for which the network device may store information for a given amount of memory resources.

Figure 1A:
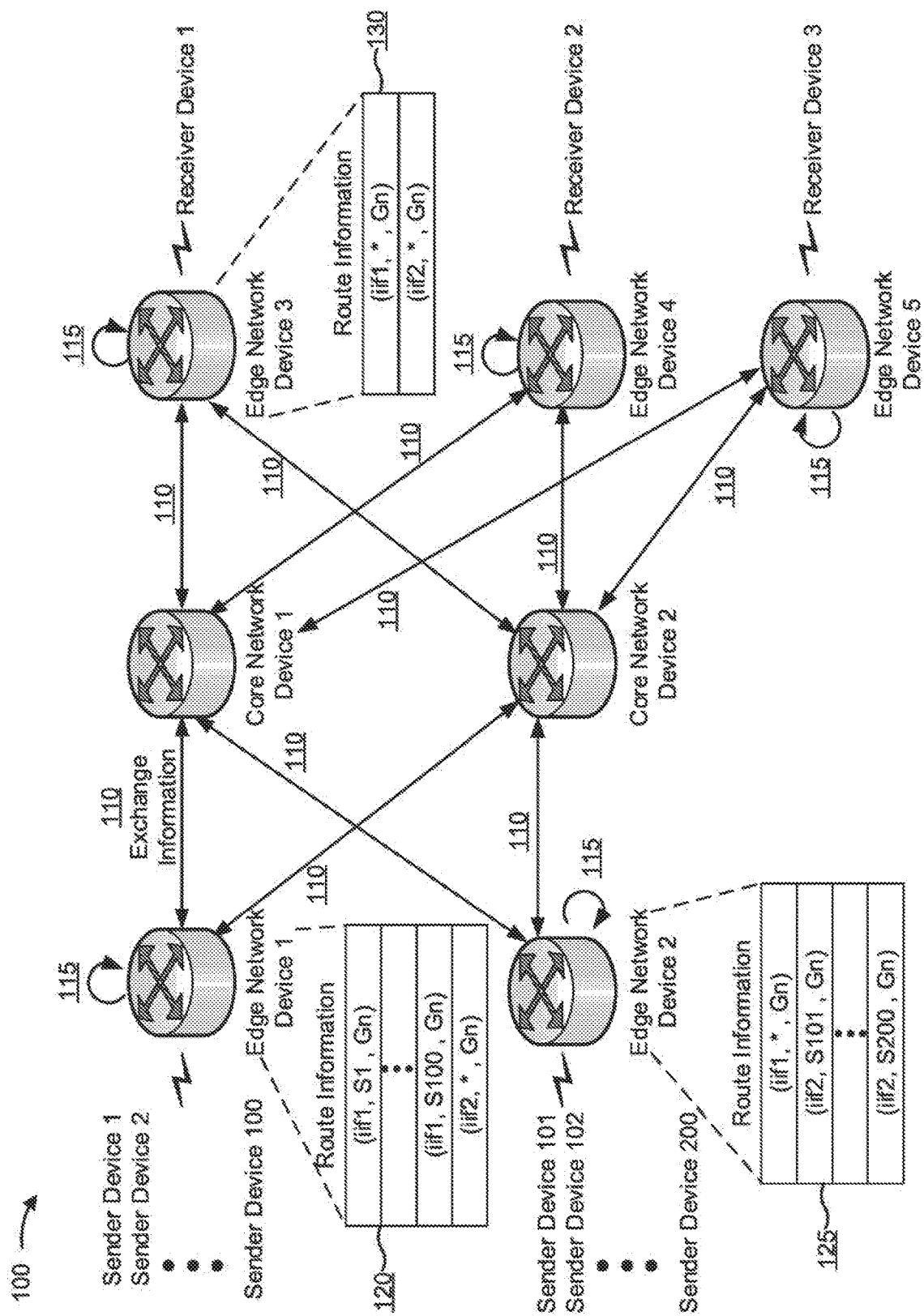
FIGS. 1A-1C are diagrams of an overview of an example implementation described herein.
Figure 1B:
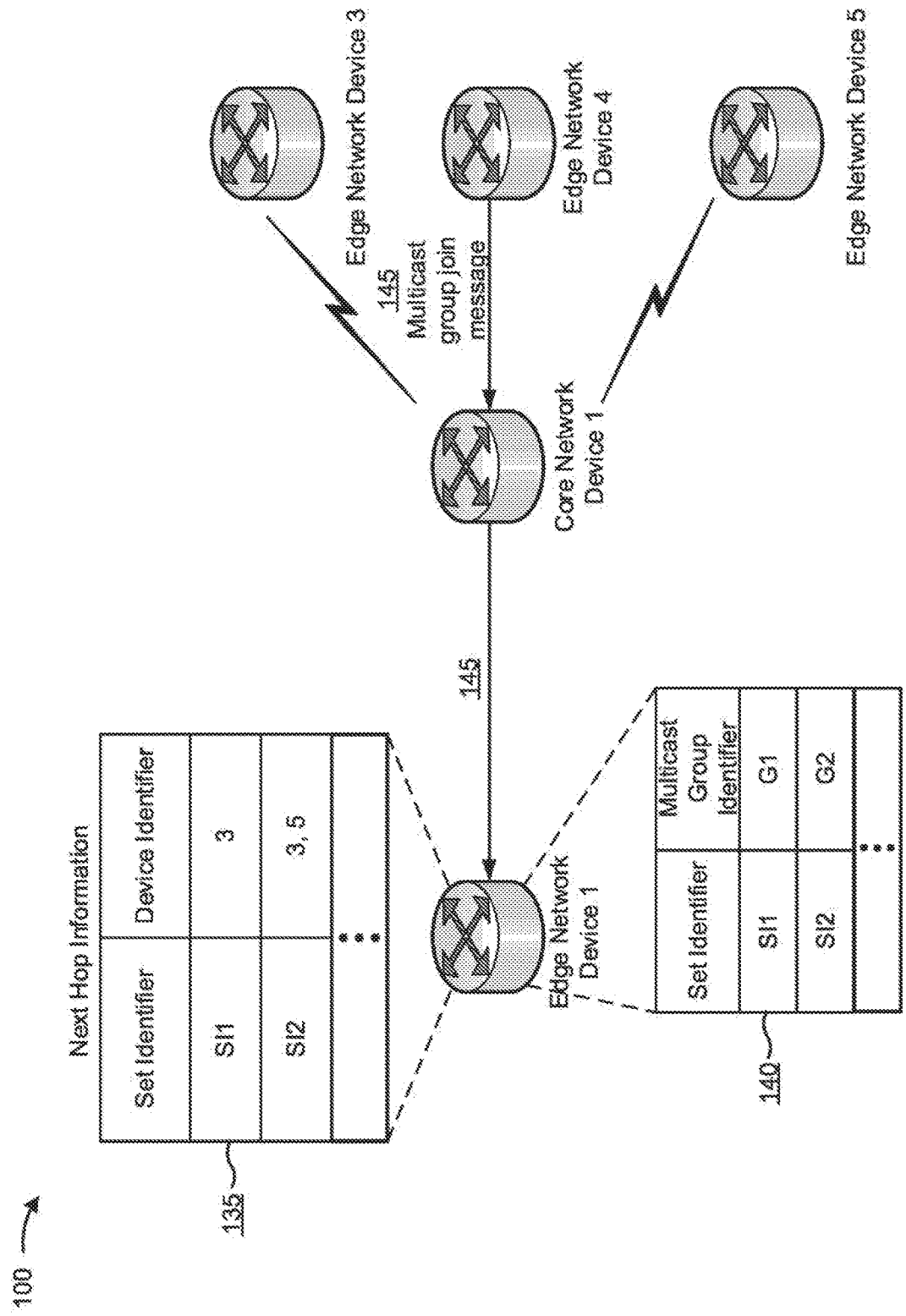
Figure 1C:
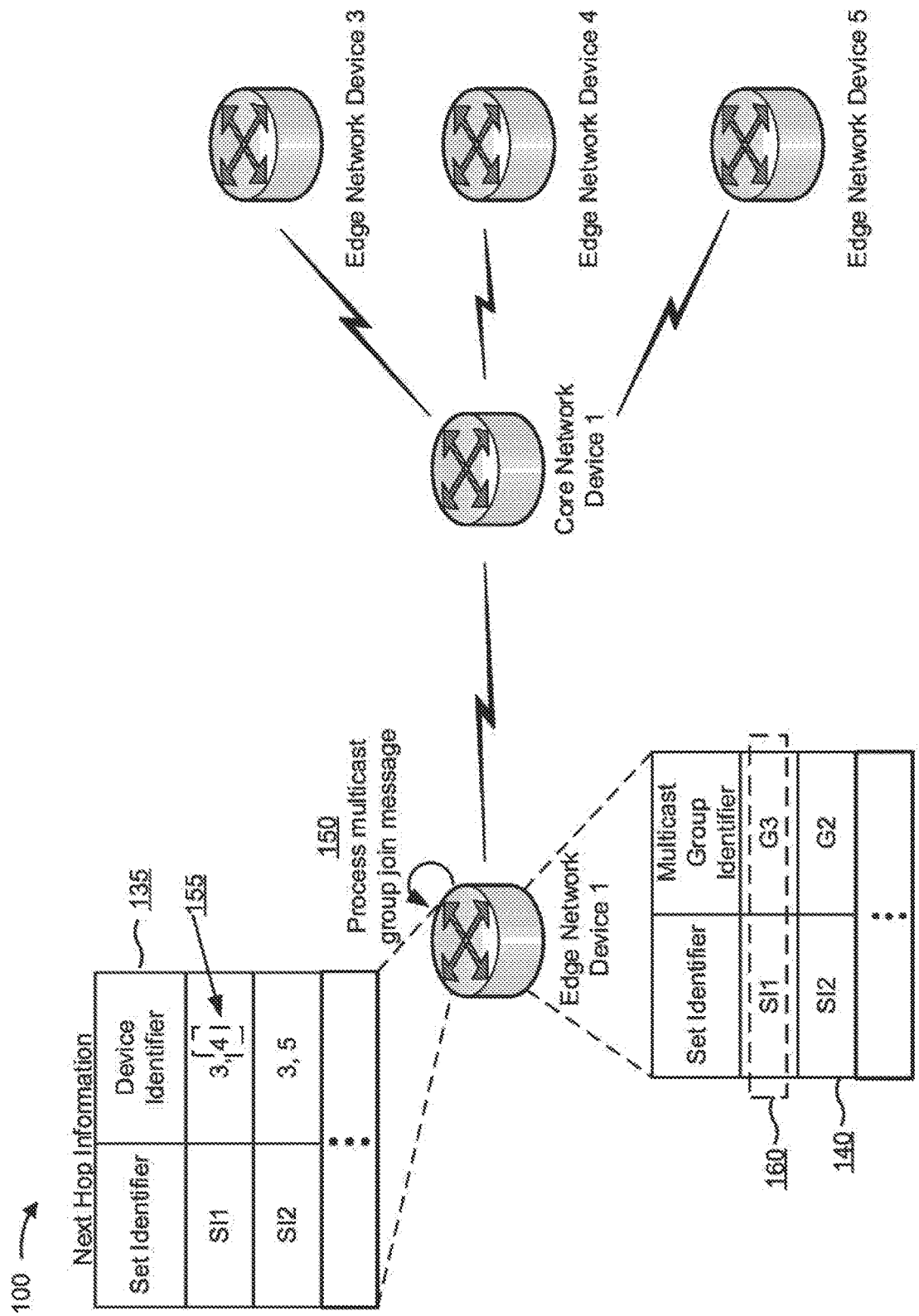

FIGS. 1A-1C are diagrams of an overview of an example implementation 100 described herein. Example implementation 100 includes sender devices 1 through 200, edge network devices 1 through 5, core network devices 1 and 2, and receiver devices 1 through 3. The edge network devices may be connected to the sender devices and/or the receiver devices. For example, edge network device 1 is shown connected to sender devices 1 through 100 via an ingress interface of edge network device 1, edge network device 2 is shown connected to sender devices 101 through 200 via an ingress interface of edge network device 2, edge network device 3 is shown connected to receiver device 1 via an egress interface of edge network device 3, edge network device 4 is shown connected to receiver device 2 via an egress interface of edge network device 4, and edge network device 5 is shown connected to receiver device 3 via an egress interface of edge network device 5.

Sender devices, receiver devices, edge network devices, and/or ingress/egress interfaces can be described as local or remote. For example, from the perspective of edge network device 1, sender devices 1 through 100 are local (e.g., based on being connected to an ingress interface of edge network device 1), while sender devices 101 through 200 are remote (e.g., based on being connected to an ingress interface of edge network device 2). As another example, from the perspective of edge network device 3, sender devices 1 through 200 are remote (e.g., based on being connected to ingress interfaces of edge network devices 1 and 2).

As further shown in FIG. 1A, and by reference numbers 110, edge network devices 1 through 5, and core network devices 1 and 2, may exchange information. For example, edge network devices 1 through 5, and core network device 1 and 2, may exchange route information identifying one or more routes (e.g., multicast routes) for sender devices 1 through 200 and/or next hop information identifying one or more next hops for traffic from sender devices 1 through 200. Next hop information will be described in more detail below with respect to FIGS. 1B and 1C.

As shown by reference numbers 115, edge network devices 1 through 5 may determine whether the route information is associated with a local or remote sender device and/or a local or remote ingress interface. For example, edge network device 1 may determine that route information for sender devices 1 through 100 is associated with local sender devices and/or a local ingress interface and that route information for sender devices 101 through 200 is associated with remote sender devices and/or a remote ingress interface.

As another example, edge network device 2 may determine that the route information for sender devices 1 through 100 is associated with remote sender devices and/or a remote ingress interface and that the route information for sender devices 101 through 200 is associated with local sender devices and/or a local ingress interface. As another example, edge network devices 3 through 5 may determine that the route information for sender devices 1 through 200 is associated with remote sender devices and/or remote ingress interfaces.

Edge network devices 1 through 5 may store the route information for sender devices 1 through 200 (e.g., in a list, a table, or another type of data structure). The manner in which each of edge network devices 1 through 5 stores the route information may depend on whether the route information is associated with a local or a remote sender device and/or a local or remote ingress interface.

As shown by reference number 120, edge network device 1 may store route information for each of sender devices 1 through 100 (e.g., shown as S1 through S100) based on sender devices 1 through 100 being local sender devices and/or being associated with the ingress interface of edge network device 1 (e.g., a first ingress interface, shown as iif1). That is, edge network device 1 may store separate route information for a local sender device and/or a local ingress interface.

Further, edge network device 1 may store route information identifying a single route for sender devices 101 through 200 (e.g., shown as *, where * represents sender devices 101 through 200) based on sender devices 101 through 200 being remote and/or being associated with an ingress interface of edge network device 2 (e.g., a second ingress interface, shown as iif2). That is, edge network device 1 may store aggregated route information associated with a remote sender device and/or a remote ingress interface (e.g., rather than storing separate route information as was the case with local sender devices and/or a local ingress interface).

This conserves memory resources of edge network device 1 by reducing an amount of route information (e.g., a quantity of routes) that edge network device 1 has to store for a remote sender device and/or a remote ingress interface. As further shown by reference number 120, the route information may include information identifying a particular multicast group (e.g., shown as Gn) associated with a particular combination of sender device and ingress interface, thereby enabling edge network device 1 to determine a multicast group to which traffic is to be provided for a particular sender device/input interface combination.

As shown by reference number 125, edge network device 2 may store route information for each of sender devices 101 through 200 (e.g., shown as S101 through S200) based on sender devices 101 through 200 being associated with the ingress interface of edge network device 2. That is, edge network device 2 may store separate route information for a local sender device and/or ingress interface.

Further, edge network device 2 may store route information identifying a single route for sender devices 1 through 100 (e.g., shown as *, similar to that described above) based on sender devices 1 through 100 being associated with an ingress interface of edge network device 1, rather than an ingress interface of edge network device 2. That is, edge network device 2 may store aggregated route information for a remote sender device and/or ingress interface. This conserves memory resources of edge network device 2 by reducing an amount of route information that edge network device 2 has to store for a remote sender device and/or remote ingress interface. As further shown by reference number 125, the route information may include information identifying a particular multicast group (e.g., shown as Gn) associated with a particular sender device and ingress interface combination, similar to that described above.

As shown by reference number 130, edge network device 3 may store route information identifying one or more aggregated routes for sender devices 1 through 200 (e.g., shown as *, similar to that described above) based on sender devices 1 through 200 being remote or being associated with remote ingress interfaces. For example, edge network device 3 may store information identifying a single route for sender devices 1 through 100 based on sender devices 1 through 100 being associated with edge network device 1 and/or the ingress interface of edge network device 1 (e.g., iif1).

As another example, edge network device 3 may store information identifying a single route for sender devices 101 through 200 based on sender devices 101 through 200 being associated with edge network device 2 and/or the ingress interface of edge network device 2 (e.g., iif2). This conserves memory resources of edge network device 3 by reducing an amount route information that edge network device 3 has to store for a remote sender device and/or a remote ingress interface.

Edge network devices 4 and 5 may store route information in a manner similar to that described with respect to reference number 130. For example, edge network devices 4 and 5 may store the information in the similar manner based on sender devices 1 through 200 being remote sender devices and/or being associated with remote ingress interfaces.

In this way, a particular edge network device may store separate route information for a local sender device or a sender device that is connected to an ingress interface of the particular edge network device, and may store aggregated route information for a remote sender device or a sender device that is connected to a remote ingress interface, thereby conserving memory resources.

Edge network devices 1 through 3 may provide traffic (e.g., a set of packets) using the stored route information. For example, edge network device 1 may provide traffic from sender devices 1 through 100 to edge network devices 3 through 5 that is destined for receiver devices 1 through 3 using the route information shown by reference number 120. As another example, edge network device 2 may provide traffic from sender devices 101 through 200 to edge network devices 3 through 5 that is destined for receiver devices 1 through 3 using the route information shown by reference number 125.

Edge network devices 3 through 5 may provide the traffic to receiver devices 1 through 3 via output interfaces of edge network devices 3 through 5 by identifying for which receiver devices traffic is destined using a data structure that includes information identifying a sender device, an input interface, and/or a multicast group, and corresponding information identifying an output interface and/or a receiver device.

As shown in FIG. 1B, and by reference number 135, edge network device 1 may store next hop information (e.g., that was exchanged between edge network devices 1 through 5, as described with respect to reference number 110). The next hop information may include a set identifier that identifies a set of edge network devices that are a set of next hops for traffic (e.g., shown as SI1 and SI2). Further, the next hop information may include device identifiers that identify the edge network devices included in each set of edge network devices (e.g., the network devices that are the next hops). For example, the next hop information may indicate that set SI1 includes edge network device 3 and that set SI2 includes edge network devices 3 and 5. In this way, edge network device 1 may identify next hops to which traffic is to be provided based on identifying a set of edge network devices.

As shown by reference number 140, edge network device 1 may store information that identifies sets of edge network devices, similar to that described above, and corresponding multicast groups associated with the sets of edge network devices (e.g., shown by multicast group identifiers G1 and G2). In this way, edge network device 1 may identify a set of edge network devices to which traffic is to be provided based on identifying a multicast group.

As shown by reference number 145, edge network device 1 may receive a multicast group join message from edge network device 4 via core network device 1 to join a particular multicast group. As an example, assume that the multicast group join message is a request to join multicast group 3 (e.g., G3). Assume, for example, that edge network device 1 has not previously stored information for multicast group 3.

As shown in FIG. 1C, and by reference number 150, edge network device 1 may process the multicast group join message. For example, edge network device 1 may process the multicast group join message to determine whether edge network device 1 has previously stored next hop information identifying edge network device 4 as a next hop for traffic to be sent to multicast group 3 (e.g., by determining whether the next hop information shown by reference number 135 includes a device identifier for edge network device 4 and/or by determining that the information shown by reference number 140 does not include information for multicast group 3). Assume, for example, that edge network device 1 determines that the next hop information shown by reference number 135 does not include a device identifier for edge network device 4 and/or that the information shown by reference number 140 does not include information for multicast group 3.

As shown by reference number 155, edge network device 1 may determine to include a device identifier for edge network device 4 in a previously stored set of device identifiers (e.g., rather than storing an additional entry in the next hop information for edge network device 4). For example, edge network device 1 may determine to include the device identifier for edge network device 4 in a previously stored set of device identifiers based on edge network device 1 not having sufficient memory resources to store an additional entry in the next hop information, based on edge network device 1 determining to conserve memory resources, and/or the like. As further shown by reference number 155, edge network device 1 may store information identifying edge network device 4 by including a device identifier for edge network device 4 in the set of device identifiers for set SI1. This reduces or eliminates the need for edge network device 1 to store an additional entry in the next hop information (e.g., an additional set identifier and corresponding set of device identifiers), thereby conserving memory resources.

Edge network device 1 may select set SI1 as the set in which to include the device identifier for edge network device 4 based on set SI1 being associated with a smaller quantity of device identifiers relative to set SI2. In this way, edge network device 1 reduces superfluous network traffic when edge network device 1 sends traffic destined only for edge network device 4 using a set of device identifiers that includes device identifiers for devices other than edge network device 4, thereby conserving network resources and/or processing resources.

As shown by reference number 160, edge network device 1 may store information indicating that traffic destined for multicast group 3 (e.g., shown by multicast group identifier G3) is to be sent to set SI1 (e.g., shown by set identifier SI1). In some implementations, the stored information for multicast group G3 may replace the stored information for multicast group G1. In this way, edge network device 1 conserves memory resources by using the same next hop information for multiple multicast groups.

As indicated above, FIGS. 1A-1C are provided merely as examples. Other examples are possible and may differ from what was described with regard to FIGS. 1A-1C. For example, although actions may be described as being performed by a particular device (e.g., edge network device 1), other devices may perform the same or similar actions. In addition, although the actions described with regard to FIGS. 1A-1C are described as being performed by various devices, the actions may be described as being performed by a component of the various devices, such as a controller or a processor.

Figure 2:
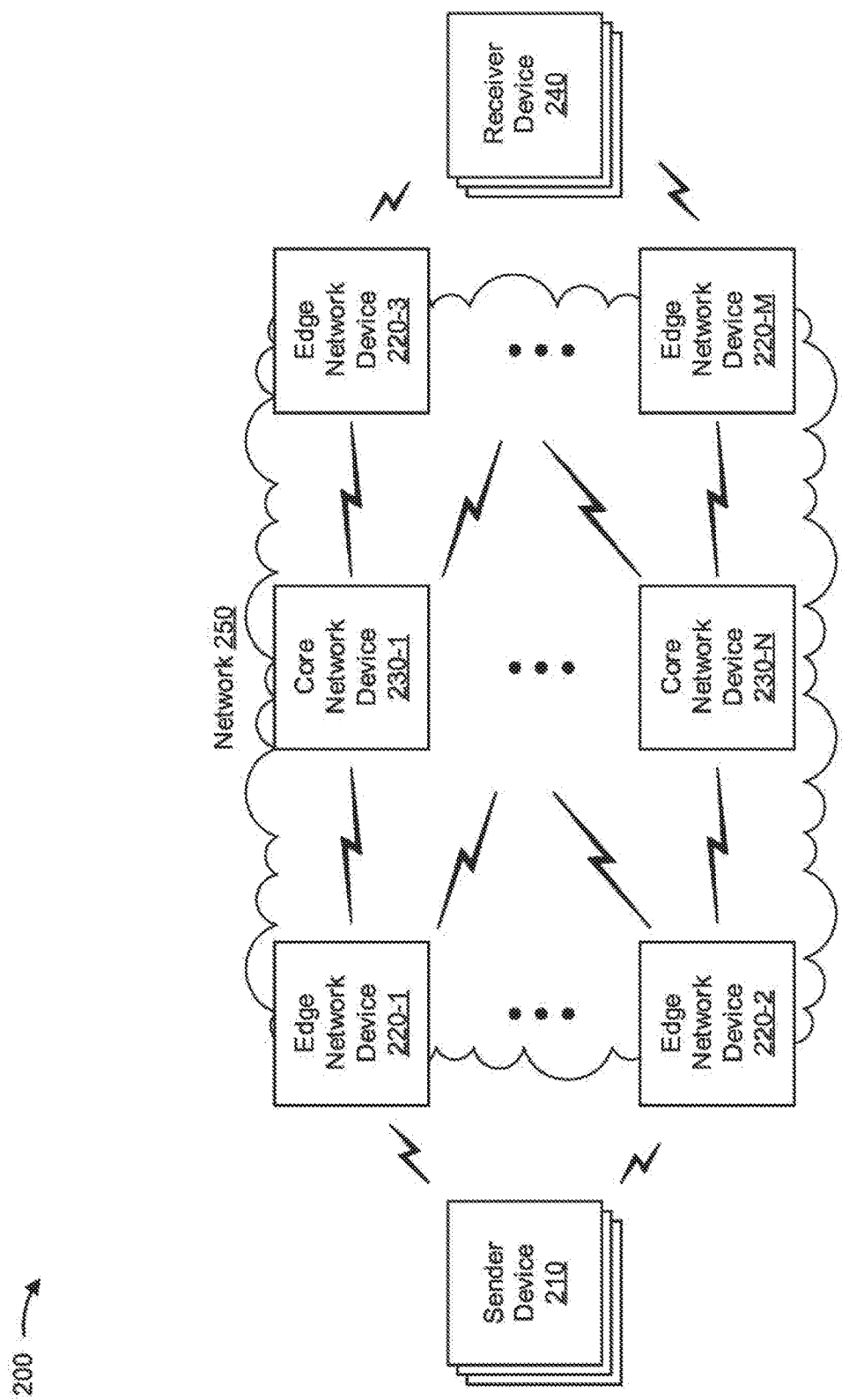
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of sender devices 210, one or more edge network devices 220-1 through 220-M (M≥1) (hereinafter referred to collectively as "edge network devices 220," and individually as "edge network device 220"), one or more core network devices 230-1 through 230-N (N≥1) (hereinafter referred to collectively as "core network devices 230," and individually as "core network device 230"), a set of receiver devices 240, and a network 250. Devices of environment 200 may interconnect via wired connections, wireless connections, or a combination of wired and wireless connections.

Sender device 210 includes one or more devices capable of receiving, storing, generating, processing, and/or providing traffic (e.g., to receiver device 240). For example, sender device 210 may include a communication and/or computing device, such as a desktop computer, a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, sender device 210 may include a virtual implementation of a machine (e.g., a computer) that executes programs like a physical machine. In some implementations, sender device 210 may be connected to an ingress interface of edge network device 220 (e.g., an ingress edge network device 220), as described elsewhere herein. Additionally, or alternatively, sender device 210 may provide traffic to edge network device 220 via the ingress interface (e.g., traffic destined for receiver device 240), as described elsewhere herein.

Edge network device 220 includes one or more devices capable of receiving, storing, generating, providing, and/or processing information, such as information related to a route and/or a next hop. For example, edge network device 220 may include a router, a gateway, a switch, a hub, a bridge, a reverse proxy, a server (e.g., a proxy server, a web server, a host server, a storage server, a server in a data center or cloud computing environment, etc.), a firewall, a security device, an intrusion detection device, a load balancer, or a similar type of device. In some implementations, edge network device 220 may function as an ingress edge network device 220 where, for example, edge network device 220 receives traffic from sender device 210 via an ingress interface of edge network device 220, as described elsewhere herein. Additionally, or alternatively, edge network device 220 may function as an egress edge network device 220 where, for example, edge network device 220 provides traffic to receiver device 240 via an egress interface of edge network device 220, as described elsewhere herein. In some implementations, edge network device 220 may be located at an edge of network 250 between one or more devices external to network 250 (e.g., sender device 210 and/or receiver device 240) and one or more other devices internal to network 250 (e.g., core network device 230), as described elsewhere herein. In some implementations, a single edge network device 220 may function as an ingress edge network device 220 and an egress edge network device 220.

Core network device 230 includes one or more devices capable of receiving, storing, generating, providing, and/or processing information, such as information related to a route and or a next hop. For example, core network device 230 may include a router, a gateway, a switch, a hub, a bridge, a reverse proxy, a server (e.g., a proxy server, a web server, a host server, a storage server, a server in a data center or cloud computing environment, etc.), a firewall, a security device, an intrusion detection device, a load balancer, or a similar type of device. In some implementations, core network device 230 may exchange information related to a route and/or a next hop between edge network devices 220, as described elsewhere herein. In some implementations, core network device 230 may be located in the core of network 250 between an ingress edge network device 220 and an egress edge network device 220, as described elsewhere herein.

Receiver device 240 includes one or more devices capable of storing, generating, processing, providing, and/or receiving traffic (e.g., from sender device 210). For example, receiver device 240 may include a communication and/or computing device, such as a desktop computer, a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, receiver device 240 may include a software implementation of a machine (e.g., a computer) that executes programs like a physical machine. In some implementations, receiver device 240 may be connected to an egress interface of edge network device 220 (e.g., an egress edge network device 220), as described elsewhere herein. Additionally, or alternatively, receiver device 240 may receive traffic from edge network device 220 via an output interface of edge network device 220 (e.g., traffic provided by sender device 210), as described elsewhere herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of advanced generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
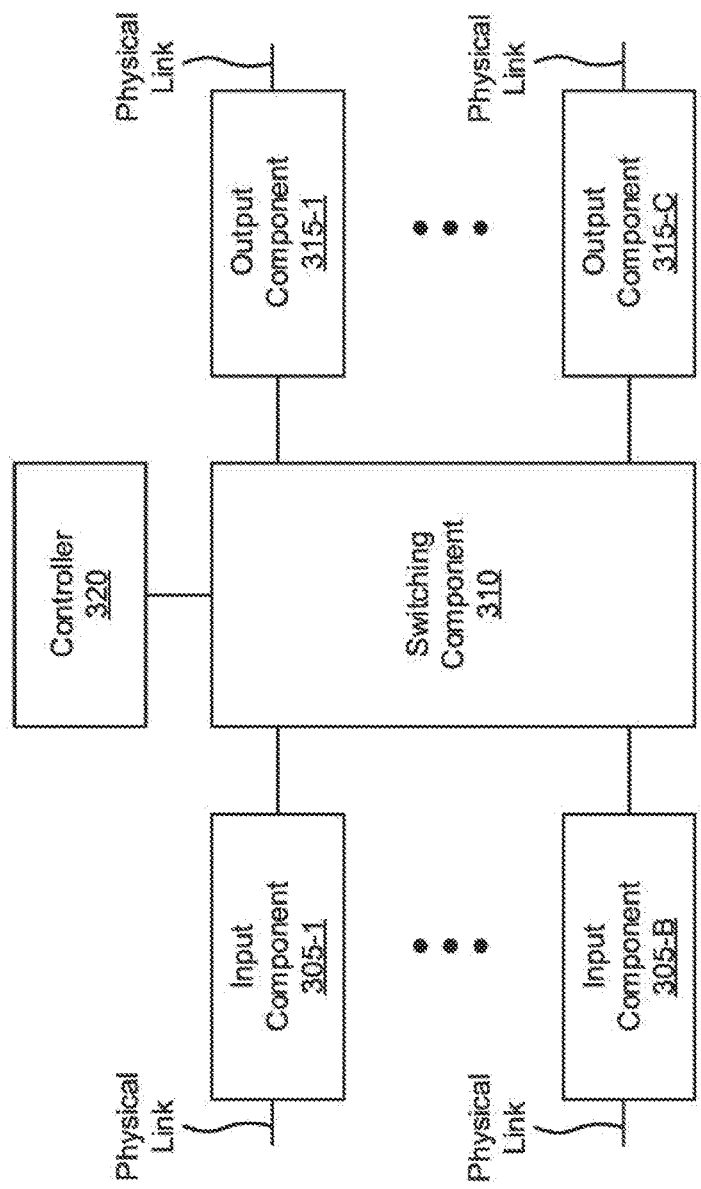
FIG. 3 is a diagram of example components of one or more devices of FIG. 2.

FIG. 3 is a diagram of example components of a device 300. Device 300 may correspond to sender device 210, edge network device 220, core network device 230, and/or receiver device 240. In some implementations, sender device 210, edge network device 220, core network device 230, and/or receiver device 240 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. As described above, in some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
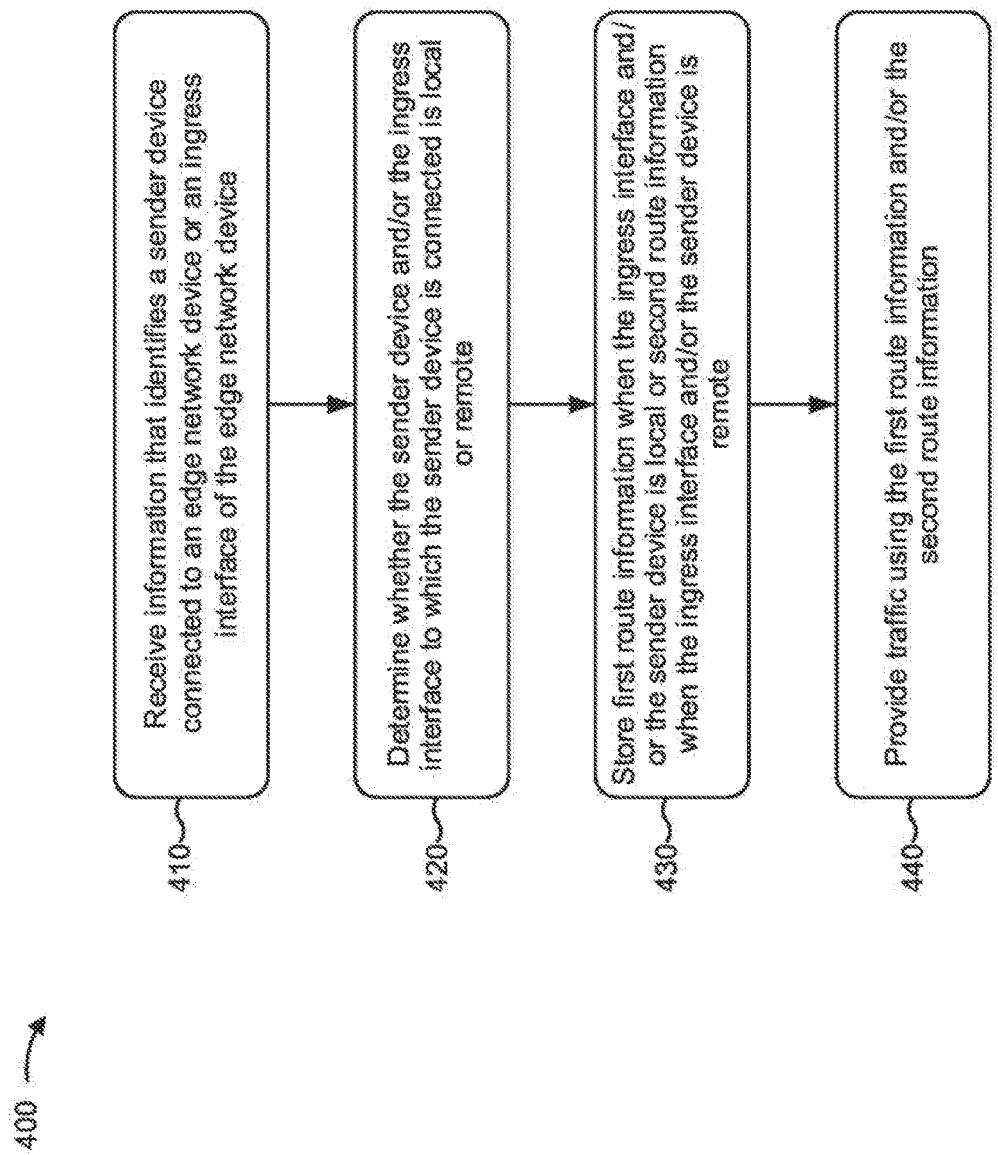
FIG. 4 is a flow chart of an example process for optimizing information related to a route for multicast traffic.

FIG. 4 is a flow chart of an example process 400 for optimizing information related to a route for multicast traffic. In some implementations, one or more process blocks of FIG. 4 may be performed by edge network device 220. In some implementations, one or more process blocks of FIG. 4 may be performed by another device or a group of devices separate from or including edge network device 220, such sender device 210, core network device 230, and/or receiver device 240.

As shown in FIG. 4, process 400 may include receiving information that identifies a sender device connected to an edge network device or an ingress interface of the edge network device (block 410). For example, edge network device 220 may receive information that identifies sender device 210 connected to a particular edge network device 220 or an ingress interface of the particular edge network device 220 to which sender device 210 is connected. In some implementations, edge network device 220 may receive the information periodically, according to a schedule, and/or when edge network device 220 requests the information from sender device 210. In some implementations, edge network device 220 may receive the information via virtual extensible LAN (VXLAN), network virtualization using generic routing encapsulation (NVGRE), multiprotocol label switching (MPLS) over generic routing encapsulation (GRE), and/or a similar type of network virtualization technology.

In some implementations, edge network device 220 may receive the information that identifies sender device 210 based on an advertisement by another edge network device 220 and/or core network device 230. In some implementations, the information that identifies sender device 210 may be advertised according to a protocol, such as a border gateway protocol (BGP), an Internet group management protocol (IGMP), and/or the like.

In some implementations, the information that identifies sender device 210 may identify a route (referred to herein as route information). For example, the information may identify a route, such as an Ethernet virtual private network (EVPN) route or a route using network layer reachability information (NLRI), via network 250 to sender device 210, another edge network device 220, and/or core network device 230. Additionally, or alternatively, the information may identify a route associated with a particular ingress interface of an ingress edge network device 220 (e.g., a local or remote ingress interface), a particular sender device 210 associated with the ingress interface (e.g., a local or remote sender device 210), and/or a multicast group to which traffic from sender device 210 and/or an ingress interface is to be provided.

In some implementations, traffic may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

In some implementations, an ingress interface may include an interface between sender device 210 and edge network device 220 via which sender device 210 provides traffic to edge network device 220. In some implementations, an ingress interface may be associated with an ingress edge network device 220 of network 250.

In this way, edge network device 220 may receive information that identifies sender device 210 connected to an ingress interface of edge network device 220 or another edge network device 220.

As further shown in FIG. 4, process 400 may include determining whether the sender device and/or the ingress interface, to which the sender device is connected, is local or remote (block 420). For example, edge network device 220 may determine whether sender device 210 and/or the ingress interface to which sender device 210 is connected is local or remote. In some implementations, edge network device 220 may use the received information described above to determine whether sender device 210 and/or the ingress interface to which sender device 210 is connected is local or remote.

In some implementations, sender device 210 may be local to a particular edge network device 220 when connected to the particular edge network device 220 (or an ingress interface of the particular edge network device 220). Additionally, or alternatively, an ingress interface may be local to a particular edge network device 220 when associated with the particular edge network device 220. In some implementations, sender device 210 may be remote to a particular edge network device 220 when connected to another edge network device 220 (or an ingress interface of the other edge network device 220). Additionally, or alternatively, an ingress interface may be remote to a particular edge network device 220 when associated with another edge network device 220.

For example, assume that network 250 includes two ingress edge network devices 220 and a single egress edge network device 220. Assume further, for example, that a first ingress edge network devices 220 has a first ingress interface and is connected to a first sender device 210, that a second ingress edge network devices 220 has a second ingress interface and is connected to a second sender device 210, and that the egress edge network device 220 does not have an ingress interface and is not connected to a sender device 210 based on being a point of egress for traffic. In this case, the first ingress interface/sender device 210 is local to the first ingress edge network device 220 and remote to the second ingress edge network device 220. Additionally, the second ingress interface/sender device 210 is local to the second ingress edge network device 220 and remote to the first ingress edge network device 220. Additionally, the first ingress interface/sender device 210 and the second ingress interface/sender device 210 are remote to the egress edge network device 220.

In some implementations, determining whether an ingress interface and/or sender device 210 is local or remote may be performed using information in a data structure. For example, the data structure may include information identifying which ingress interfaces and/or sender devices 210 are connected to edge network device 220. Additionally, or alternatively, edge network device 220 may determine whether an ingress interface and/or sender device 210 is local or remote based on the received information. For example, the received information may include an indicator that indicates whether the information identifying the route came from a local or remote ingress interface and/or sender device 210, thereby conserving memory resources of edge network device 220 by reducing or eliminating the need for edge network device 220 to store the information.

In this way, edge network device 220 may determine whether sender device 210 and/or an ingress interface of edge network device 220 is local or remote.

As further shown in FIG. 4, process 400 may include storing first route information when the ingress interface and/or the sender device is local or second route information when the ingress interface and/or the sender device is remote (block 430). For example, edge network device 220 may store the first route information or the second route information. In some implementations, edge network device 220 may store first route information when the ingress interface and/or sender device 210 is local. Additionally, or alternatively, edge network device 220 may store second route information when the ingress interface and/or sender device 210 is remote.

In some implementations, route information may include information that identifies sender device 210, an ingress interface associated with sender device 210, a multicast group to which traffic from sender device 210 is to be sent, and/or the like. In some implementations, edge network device 220 may store the route information using the received information described above.

In some implementations, when storing first route information, a particular edge network device 220 may store separate route information for each local sender device 210 associated with the particular edge network device 220 (e.g., by storing a separate entry in a data structure for each local sender device 210). For example, an ingress edge network device 220 may store first route information for each local sender device 210 connected to a local ingress interface of the ingress edge network device 220.

Continuing with the previous example, assuming that there are two local sender devices 210 connected to a local ingress interface of the ingress edge network device 220, the ingress edge network device 220 may store route information for a first local sender device 210 and different route information for a second local sender device 210. In this way, edge network device 220 stores first route information for each local sender device 210 connected to an ingress interface of edge network device 220 (e.g., for local sender devices 210 and/or local ingress interfaces).

In some implementations, when storing second route information, edge network device 220 may store aggregated route information for remote sender devices 210 and/or remote ingress interfaces. For example, edge network device 220 may store aggregated route information for remote sender devices 210 and/or remote ingress interfaces associated with another edge network device 220.

In some implementations, when storing aggregated route information, edge network device 220 may store a single entry of route information for remote sender devices 210 associated with a remote ingress interface rather than storing first route information, where route information is stored for each remote sender device 210 separately (e.g., as separate entries in a data structure, as was the case with local sender devices 210). For example, assuming that there are two remote sender devices 210 connected a remote edge network device 220, edge network device 220 may store aggregated route information associated with both remote sender devices 210 (e.g., rather than storing route information for each sender device 210 separately as separate entries in a data structure).

In this way, edge network device 220 may store second route information (e.g., aggregated route information) for remote sender device 210 and/or remote ingress interfaces, rather than storing first route information (e.g., separate route information, as was the case with local sender devices 210 and/or ingress interfaces).

In some implementations, the second route information may be aggregated based on remote ingress interfaces, multicast groups, and/or the like. Additionally, or alternatively, the second route information may be aggregated based on an egress interface to which traffic is to be provided. In this way, edge network device 220 may store a smaller amount of route information for remote sender devices 210 and/or remote interfaces, thereby conserving memory resources of edge network device 220.

In some implementations, before or when storing the first route information, edge network device 220 may generate the first route information. For example, edge network device 220 may generate the first route information using the received information. In some implementations, edge network device 220 may determine an ingress interface associated with sender device 210 (e.g., by identifying an ingress interface identifier included in the received information). Additionally, or alternatively, edge network device 220 may identify a multicast group associated with sender device 210 (e.g., by identifying a multicast group identifier included in the received information).

Additionally, or alternatively, edge network device 220 may identify a device identifier for sender device 210 (e.g., by identifying a device identifier included in the received information). In some implementations, edge network device 220 may store the ingress interface identifier, the multicast group identifier, and/or the device identifier in association with each other to generate the first route information.

In some implementations, before or when storing the second route information, edge network device 220 may generate the second route information. For example, edge network device 220 may generate the second route information using the received information. In some implementations, edge network device 220 may determine an ingress interface associated with one or more sender devices 210 (e.g., by identifying an ingress interface identifier included in the received information). Additionally, or alternatively, edge network device 220 may identify a multicast group associated with one or more sender devices 210 (e.g., by identifying a multicast group identifier included in the received information).

Additionally, or alternatively, edge network device 220 may identify a string (e.g., a character, such as *, as described above, a string of characters, a symbol, etc.) to represent device identifiers for the one or more sender devices 210 associated with the second route information. In some implementations, edge network device 220 may store the ingress interface identifier, the multicast group identifier, and/or the string in association with each other to generate the second route information.

In this way, edge network device 220 may store first route information and/or second route information based on whether sender device 210 and/or the ingress interface, to which sender device 210 is connected, is local or remote.

As further shown in FIG. 4, process 400 may include providing traffic using the first route information and/or the second route information (block 440). For example, edge network device 220 may provide traffic to another edge network device 220, core network device 230, and/or receiver device 240. In some implementations, edge network device 220 may provide the traffic using the first route information or the second route information.

In some implementations, edge network device 220 may receive traffic from sender device 210. For example, an ingress edge network device 220 may receive traffic from a local sender device 210 via a local ingress interface. In some implementations, edge network device 220 may identify a multicast group associated with the local sender device 210 that provided the traffic and/or the local ingress interface via which the traffic was received. In some implementations, edge network device 220 may provide the traffic to the multicast group using the stored first route information. For example, edge network device 220 may provide the traffic to a multicast group identified by the first route information. In this way, edge network device 220 may provide traffic using first route information.

Additionally, or alternatively, edge network device 220 may receive traffic from a remote sender device 210. For example, an egress edge network device 220 may receive traffic from a remote sender device 210 via an ingress edge network device 220 and/or core network device 230. In some implementations, edge network device 220 may identify an egress interface and/or receiver device 240 for the traffic. For example, an egress edge network device 220 may identify an egress interface and/or a particular receiver device 240 to which the traffic is to be provided by using second route information associated with the traffic.

Continuing with the previous example, edge network device 220 may identify an egress interface for the traffic by identifying an ingress interface and/or a multicast group associated with the traffic and identifying a corresponding egress interface associated with the ingress interface and/or the multicast group (e.g., using a data structure). This conserves processing resources of edge network device 220 when performing a lookup of an egress interface by reducing a quantity of entries in a data structure that edge network device 220 has to process (e.g., based on the second route information being aggregated for multiple remote sender devices 210). In some implementations, edge network device 220 may provide the traffic to the identified receiver device 240 via the identified egress interface. In this way, edge network device 220 may use second route information to provide traffic (e.g., to receiver device 240 via an egress interface).

In some implementations, edge network device 220 may provide information identifying devices associated with a multicast group. For example, edge network device 220 may advertise membership to a group (e.g., a multicast group) prior to providing the traffic (e.g., based on receiving a multicast group join message). In some implementations, edge network device 220 may suppress or prevent subsequent requests from other devices to join the group and/or suppress or prevent subsequent advertisements of the membership to the group. This conserves processing resources related to providing information identifying devices associated with a multicast group.

In some implementations, edge network device 220 may provide information indicating that a member of a multicast group has left the group (e.g., by sending a multicast group leave message). In some implementations, edge network device 220 may suppress or prevent multicast group leave messages except when the last member of a multicast group has left the multicast group. For example, edge network device 220 may advertise a group leave message when the last device has left the group (e.g., rather than when each member of the multicast group leaves), thereby conserving processing resources related to providing information indicating that a member of a multicast group has left the multicast group).

In this way, edge network device 220 may provide traffic using the first route information and/or the second route information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
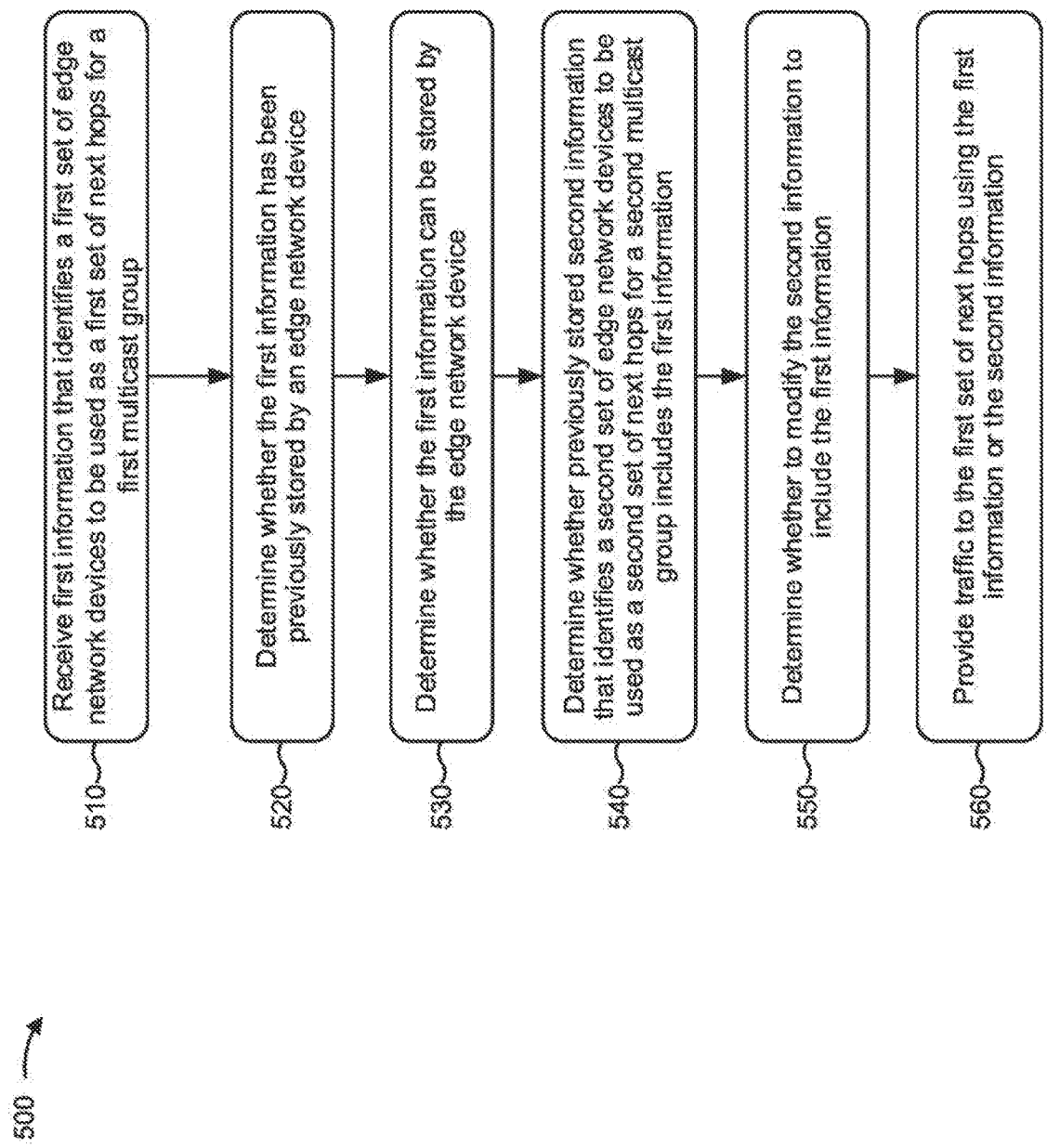
FIG. 5 is a flow chart of an example process for optimizing information related to a next hop for multicast traffic.

FIG. 5 is a flow chart of an example process 500 for optimizing information related to a next hop for multicast traffic. In some implementations, one or more process blocks of FIG. 5 may be performed by edge network device 220. In some implementations, one or more process blocks of FIG. 5 may be performed by another device or a group of devices separate from or including edge network device 220, such sender device 210, core network device 230, and/or receiver device 240.

As shown in FIG. 5, process 500 may include receiving first information that identifies a first set of edge network devices to be used as a first set of next hops for a first multicast group (block 510). For example, edge network device 220 may receive first information that identifies a first set of edge network devices 220 to be used as a first set of next hops for a first multicast group (referred to herein as next hop information). In some implementations, edge network device 220 may receive the first information in a manner similar to that described above with respect to FIG. 4.

In some implementations, the first set of edge network devices 220 may be associated with providing traffic via network 250. For example, the first set of edge network devices 220 may be associated with a first set of next hops for traffic via network 250 (e.g., traffic from an ingress edge network device 220 destined for receiver device 240). In some implementations, the first set of edge network devices 220 may be used as a first set of next hops for traffic sent to a multicast group.

In this way, edge network device 220 may receive first information that identifies a first set of edge network devices to be used as a first set of next hops for a first multicast group.

As further shown in FIG. 5, process 500 may include determining whether the first information has been previously stored by an edge network device (block 520). For example, edge network device 220 may determine whether the first information has been previously stored by edge network device 220. In some implementations, edge network device 220 may use information in a data structure to determine whether edge network device 220 has previously stored the first information.

In some implementations, when edge network device 220 is determining whether the first information has been previously stored, edge network device 220 may determine whether the first information has been stored separately from other information identifying other sets of edge network devices 220 (e.g., as a separate entry in a data structure). For example, assume that a first multicast group has a first edge network device 220 and a second edge network device 220 as next hops. In this case, edge network device 220 may determine whether information identifying the first and second edge network devices 220 has been previously stored in a data structure as a separate entry from information identifying a second set of edge network devices 220 for a second multicast group that includes a third edge network device 220 and a fourth edge network device 220.

In some implementations, if the first information has been previously stored separately, (e.g., as a separate entry in a data structure) from other information for other sets of edge network devices 220, then edge network device 220 may store a set of instructions indicating that the previously stored first information is to be used to provide traffic to the first multicast group. In this way, edge network device 220 may use previously stored first information to provide traffic to a first set of edge network devices 220 as a first set of next hops for a first multicast group. This conserves processing resources and/or memory resources associated with storing redundant information.

In this way, edge network device 220 may determine whether the first information has been previously stored by edge network device 220.

As further shown by FIG. 5, process 500 may include determining whether the first information can be stored by the edge network device (block 530). For example, edge network device 220 may determine whether the first information can be stored by edge network device 220 as a separate entry in a data structure used to store information identifying various sets of edge network devices 220. In some implementations, edge network device 220 may determine whether the first information can be stored, after determining that edge network device 220 has not previously stored the first information.

In some implementations, edge network device 220 may determine whether edge network device 220 has sufficient memory resources to store the first information. For example, edge network device 220 may determine whether edge network device 220 has stored information identifying a threshold quantity of sets of edge network devices 220, whether a threshold amount of memory space of edge network device 220 is available, whether a data structure used to store information identifying sets of edge network devices 220 has a threshold quantity of entries, and/or the like.

In some implementations, if edge network device 220 determines that edge network device 220 has sufficient memory resources to store the first information, then edge network device 220 may store the information (e.g., as a new entry in a data structure). Additionally, or alternatively, edge network device 220 may store a set of instructions indicating that the first information is to be used when providing traffic to the multicast group associated with the set of edge network devices 220. Conversely, in some implementations, if edge network device 220 determines that edge network device 220 does not have sufficient memory resources to store the first information, then edge network device 220 may not store, or attempt to store, the first information (e.g., as a separate entry in a data structure), thereby conserving processing resources of edge network device 220.

In this way, edge network device 220 may determine whether the first information can be stored by edge network device 220.

As further shown by FIG. 5, process 500 may include determining whether previously stored second information that identifies a second set of edge network devices to be used as a second set of next hops for a second multicast group includes the first information (block 540). For example, edge network device 220 may determine whether an entry in a data structure for a second set of edge network devices includes information identifying the first set of edge network devices. In some implementations, edge network device 220 may determine whether the previously stored second information includes the first information, after determining that edge network device 220 cannot store the first information (e.g., as a separate entry in a data structure based on insufficient memory resources).

In some implementations, when determining whether previously stored second information includes the first information, edge network device 220 may perform a comparison of device identifiers associated with the first and second sets of edge network devices 220. For example, assume that the first set of edge network devices 220 includes a first edge network device 220 and that the second set of edge network devices 220 includes the first edge network device 220 and a second edge network device 220.

In this case, edge network device 220 may compare device identifiers for the first set of edge network devices 220 included in the first information (e.g., the first edge network device 220) and the second set of edge network devices 220 included in the second information (e.g., the first edge network device 220 and the second edge network device 220) to determine whether the second information includes the first information. In this way, edge network device 220 may compare devices identifiers for the first set of edge network devices 220 and the second set of edge network devices 220 to determine whether previously stored second information for the second set of edge network devices 220 includes the first information for the first set of edge network devices 220.

In some implementations, edge network device 220 may determine a result of the comparison. Continuing with the previous example, edge network device 220 may determine that the second information includes the first information based on determining that the second set of edge network devices 220 includes the edge network devices 220 of the first set of edge network devices 220 (e.g., despite the second set of edge network devices 220 including other edge network devices 220).

In some implementations, if previously stored second information includes the first information, then edge network device 220 may store a set of instructions indicating that edge network device 220 is to use the second information to identify next hops for traffic destined for the first set of edge network devices 220. In this way, edge network device 220 may use previously stored second information for a second set of edge network devices 220 to identify next hops for a first set of edge network devices 220. This conserves memory resources of edge network device 220 by reducing or eliminating a need for edge network device 220 to store the first information for the first set of edge network devices 220 (e.g., as a separate data entry).

In some implementations, previously stored information for multiple sets of edge network devices 220 may include the first information. In some implementations, edge network device 220 may select one of the sets of edge network devices 220 to use to identify next hops for the first set of edge network devices 220. In some implementations, edge network device 220 may select one of the sets of edge network devices 220 to use based on which set of edge network devices 220 includes the fewest quantity of edge network devices 220 not included in the first set of edge network devices 220.

For example, assume that the first set of edge network devices 220 includes first and second edge network devices 220. Further, assume, for example, that a second set of edge network devices 220 includes the first edge network device 220, the second edge network device 220, and a third edge network device 220. Still further, assume, for example, that a third set of edge network devices 220 includes the first edge network device 220, the second edge network device 220, the third edge network device 220, and a fourth edge network device 220.

In this case, edge network device 220 may select the second set of edge network devices 220, rather than the third set of edge network devices 220, to use to identify next hops for the first set of edge network devices 220 based on the second set of edge network devices 220 including fewer edge network devices 220 not included in the first set of edge network devices 220 relative to the third set of edge network devices 220. For example, the second set of edge network devices 220 includes one edge network device 220 not included in the first set of edge network devices 220 (e.g., the third edge network device 220), whereas the third set of edge network devices 220 includes two edge network devices 220 not included in the first set of edge network devices 220 (e.g., the third edge network device 220 and the fourth edge network device 220). In this way, edge network device 220 reduces superfluous network traffic when using another set of edge network devices 220 to identify next hops for the first set of edge network devices 220.

In some implementations, edge network device 220 may select one of the sets of edge network devices 220 to use for the first set of edge network devices 220 randomly. In some implementations, edge network device 220 may select one of the sets of edge network devices 220 to use for the first set of edge network devices 220 based on input from a user of edge network device 220 or another device.

In this way, edge network device 220 may determine whether previously stored second information includes the first.

As further shown in FIG. 5, process 500 may include determining whether to modify the second information to include the first information (block 550). For example, edge network device 220 may determine whether to modify the previously stored second information. In some implementations, if previously stored second information for the second set of edge network devices 220 does not include the first information identifying the first set of edge network devices 220, then edge network device 220 may determine whether to modify the previously stored second information (e.g., to include the first information in the second information).

As an example, assume that the first set of edge network devices 220 includes a first edge network device 220 and a second edge network device 220. Further assume that previously stored second information for the second set of edge network devices 220 does not include information identifying both the first and second edge network devices 220. In this case, edge network device 220 may select a set of edge network devices 220 for which to modify the second information for the selected set of edge network devices 220, such as to include the first information identifying the first set of edge network devices 220.

In some implementations, when selecting a set of edge network devices 220, edge network device 220 may select a set of edge network devices 220 with the fewest quantity of edge network devices 220 relative to other sets of edge network devices 220. For example, assuming that the second set of edge network devices 220 includes two edge network devices 220 and a third set of edge network devices 220 includes three edge network devices 220, then edge network device 220 may select the second set of edge network devices 220 based on the second set of edge network devices 220 including fewer edge network devices 220 relative to the third set of edge network devices 220. In some implementations, if multiple sets of edge network devices 220 include the same quantity of edge network devices 220, then edge network device 220 may select a set of edge network devices 220 randomly, based on a set of rules, based on input from a user of a device, and/or the like.

In some implementations, when edge network device 220 has selected the set of edge network devices 220 to modify, edge network device 220 may modify second information identifying the second set of edge network devices 220 by adding the first information identifying the first set of edge network devices 220 to the second information. For example, assume the first set of edge network devices 220 includes first and second edge network devices 220 and that the selected set of edge network devices 220 includes a third edge network device 220. In this case, edge network device 220 may modify the information for the second set of edge network devices 220 such that the information includes information identifying the first, second, and third edge network devices 220 (e.g., rather than just the third edge network device 220). This conserves memory resources by reducing or eliminating a need for edge network device 220 to store a separate entry in a data structure for the first information identifying the first set of edge network devices 220.

In some implementations, edge network device 220 may store a set of instructions that indicates that when edge network device 220 is to provide traffic to the multicast group associated with the first set of edge network devices 220, edge network device 220 may use the second information for the modified second set of edge network devices 220 to determine next hops for the traffic.

In this way, edge network device 220 may determine whether to modify the previously stored second information to include the first information identifying the first set of edge network devices 220.

As further shown in FIG. 5, process 500 may include providing traffic to the first set of next hops using the first information or the second information (block 560). For example, edge network device 220 may provide traffic to the first set of edge network devices 220 as the set of next hops for the multicast group.

In some implementations, edge network device 220 may use the first information to provide the traffic to the first set of edge network devices 220 when edge network device 220 has stored the first information as a separate entry in a data structure. Additionally, or alternatively, edge network device 220 may use the second information to provide the traffic to the first set of edge network devices 220. In some implementations, edge network device 220 may use previously stored second information identifying the second set of edge network devices 220 when the previously stored second information includes information identifying the first set of edge network devices 220. Additionally, or alternatively, edge network device 220 may use the second information identifying the second set of edge network devices 220 when edge network device 220 modifies the second information to include the first information identifying the first set of edge network devices 220.

In some implementations, edge network device 220 may use the first information or the second information to identify next hops for traffic associated with a multicast group. For example, assuming that the first set of edge network devices 220 includes a first edge network device 220, edge network device 220 may identify the first edge network device 220 as a next hop for traffic from edge network device 220 using the first information. As another example, assuming that the first set of edge network devices 220 includes a first edge network device 220 and the second set of edge network devices 220 includes the first edge network device 220 and a second edge network device 220. Continuing with the previous example, edge network device 220 may identify the first edge network device 220 and the second edge network device 220 as next hops for traffic destined for the first edge network device 220 using the second information. In this case, the second edge network device 220 may drop a packet received based on the packets being sent to a multicast group different than the multicast group of the second edge network device 220.

In some implementations, edge network device 220 may store information related to a state of edge network devices 220 included in a set of edge network devices 220. For example, a state of a particular edge network device 220 may be related to whether the particular edge network device 220 has left the multicast group associated with the set of edge network devices 220.

In some implementations, edge network device 220 may remove information for the particular edge network device 220 from the information associated with a set of edge network devices 220 when the particular edge network device 220 leaves the multicast group. This conserves memory resources by reducing or eliminating storage of information for edge network devices 220 that have left a multicast group associated with a set of edge network devices 220.

In this way, edge network device 220 may provide traffic to a set of next hops using the first information for the first set of edge network devices 220 and/or the second information for the second set of edge network devices 220.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Although actions described herein are described as being performed by various devices (e.g., sender device 210, edge network device 220, core network device 230, and/or receiver device 240), the actions may be described as being performed by a component (e.g., controller 320) of the various devices.

Implementations described herein permit a network device, such as an edge network device, to aggregate and/or consolidate route information and/or next hop information. In this way, the network device conserves memory resources by reducing an amount of information that the network device has to store, and conserves processing resources by reducing an amount of information that the network device has to process to perform a lookup of a route and/or a next hop for traffic. In addition, the network device increases an efficiency of performing a route lookup and/or a next hop lookup by reducing an amount of time that the network device takes to perform the look up.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
   a memory; and
   one or more processors to:
      receive first next hop information that identifies a first set of edge network devices to be used as a first set of next hops for a first multicast group;
      determine whether the first device has sufficient memory to store the first next hop information based on determining one or more of:
         whether a threshold amount of memory space of the first device is available,
         whether the first device has stored information identifying a threshold quantity of a first set of devices, or
         whether a data structure used to store the first next hop information has a threshold quantity of entries;
      determine whether second next hop information, that identifies a second set of edge network devices to be used as a second set of next hops for a second multicast group, includes the first next hop information based on receiving the first next hop information,
         where the first set of edge network devices includes a first edge network device and the second set of edge network devices includes the first edge network device and a second edge network device, and
         where the one or more processors, when determining whether the second next hop information includes the first next hop information, are to:
            perform a comparison of device identifiers for the first set of edge network devices and the second set of edge network devices to determine whether the second next hop information includes the first next hop information;
      determine whether to modify the second next hop information to include the first next hop information based on determining whether the second next hop information includes the first next hop information; and
      provide traffic to the first set of next hops using the first next hop information or the second next hop information based on determining whether to modify the second next hop information to include the first next hop information.

2. The first device of claim 1, where the one or more processors are further to:
   determine whether the first next hop information has been previously stored by the first device.

3. The first device of claim 1, where the one or more processors are further to:
   determine whether the first next hop information is stored separately from other information identifying other sets of devices.

4. The first device of claim 1, where the first device is an edge network device of a plurality of edge network devices.

5. The first device of claim 1, where the one or more processors are further to:

store a set of instructions indicating that the first device is to use the second next hop information to identity next hops for traffic destined to the first set of edge network devices when the second next hop information includes the first next hop information.

6. The first device of claim 1, where the one or more processors are further to:
remove information for a particular device from the information associated with first next hop information that identifies the first set of edge network devices when the particular device leaves the first multicast group.

7. The first device of claim 1, where the one or more processors are further to:
determine that the first device has the threshold amount of memory space to store the first next hop information; and
store the first next hop information as a new entry in the data structure.

8. A non-transitory computer-readable medium storing instructions, the instructions comprising:
one or more instructions that, when executed by one or more processors of a first device, cause the one or more processors to:
receive first next hop information that identifies a first set of edge network devices to be used as a first set of next hops for a first multicast group;
determine whether the first device has sufficient memory to store the first next hop information based on determining one or more of:
whether a threshold amount of memory space of the first device is available;
whether the first device has stored information identifying a threshold quantity of a first set of devices, or
whether a data structure used to store the first next hop information has a threshold quantity of entries;
determine whether second next hop information, that identifies a second set of edge network devices to be used as a second set of next hops for a second multicast group, includes the first next hop information based on receiving the first next hop information,
where the first set of edge network devices includes a first edge network device and the second set of edge network devices includes the first edge network device and a second edge network device, and
where the one or more instructions, when executed by the one or more processors to determine whether the second next hop information includes the first next hop information, cause the one or more processors to:
perform a comparison of device identifiers for the first set of edge network devices and the second set of edge network devices to determine whether previously stored second next hop information includes the first next hop information;
determine whether to modify the second next hop information to include the first next hop information based on determining whether the second next hop information includes the first next hop information; and
provide traffic to the first set of next hops using the first next hop information or the second next hop information based on determining whether to modify the second next hop information to include the first next hop information.

9. The non-transitory computer-readable medium of claim 8, where the one or more instructions, when executed by the one or more processors, further cause the one or more processors to:
determine whether the first next hop information has been previously stored in the first device.

10. The non-transitory computer-readable medium of claim 8, where the one or more instructions, when executed by the one or more processors, further cause the one or more processors to:
determine whether the first next hop information has been stored separately from other information identifying other sets of devices.

11. The non-transitory computer-readable medium of claim 8, where the one or more instructions, when executed by the one or more processors, further cause the one or more processors to:
store a set of instructions to use the second next hop information to identify next hops for traffic destined to the first set of edge network devices when the second next hop information includes the first next hop information.

12. The non-transitory computer-readable medium of claim 8, where the first device is an edge network device of a plurality of edge network devices.

13. The non-transitory computer-readable medium of claim 8, where the one or more instructions, when executed by the one or more processors, further cause the one or more processors to:
remove information for a particular device from the information associated with first next hop information that identifies the first set of edge network devices when the particular device leaves the first multicast group.

14. The non-transitory computer-readable medium of claim 8, where the one or more instructions, when executed by the one or more processors, further cause the one or more processors to:
determine that the first device has the threshold amount of memory space to store the first next hop information; and
store the first next hop information as a new entry in the data structure.

15. A method comprising:
receiving, by a first device, first next hop information that identifies a first set of edge network devices to be used as a first set of next hops for a first multicast group;
determining, by the first device, whether the first device has sufficient memory to store the first next hop information based on determining one or more of:
whether a threshold amount of memory space of the first device is available;
whether the first device has stored information identifying a threshold quantity of a first set of devices, or
whether a data structure used to store the first next hop information has a threshold quantity of entries;
determining, by the first device, whether second next hop information, that identifies a second set of edge network devices to be used as a second set of next hops for a second multicast group, includes the first next hop information based on receiving the first next hop information,
where the first set of edge network devices includes a first edge network device and the second set of edge network devices includes the first edge network device and a second edge network device, and where determining whether the second next hop information includes the first next hop information comprises:

performing a comparison of device identifiers for the first set of edge network devices and the second set of edge network devices to determine whether previously stored second next hop information includes the first next hop information;

determining, by the first device, whether to modify the second next hop information to include the first next hop information based on determining whether the second next hop information includes the first next hop information; and providing, by the first device, traffic to the first set of next hops using the first next hop information or the second next hop information based on determining whether to modify the second next hop information to include the first next hop information.

16. The method of claim 15, comprising:

determining whether the first next hop information has been previously stored by the first device.

17. The method of claim 15, further comprising:

determining whether the first next hop information has been stored separately from other information identifying other sets of devices.

18. The method of claim 15, further comprising:

storing a set of instructions indicating that the first device is to use the second next hop information to identity next hops for traffic destined to the first set of edge network devices when the second next hop information includes the first next hop information.

19. The method of claim 15, further comprising:

removing information for a particular device from the information associated with first next hop information that identifies the first set of edge network devices when the particular device leaves the first multicast group.

20. The method of claim 15, further comprising:

determining that the first device has the threshold amount of memory space to store the first next hop information; and storing the first next hop information as a new entry in the data structure.

\* \* \* \* \*